Figure 1:
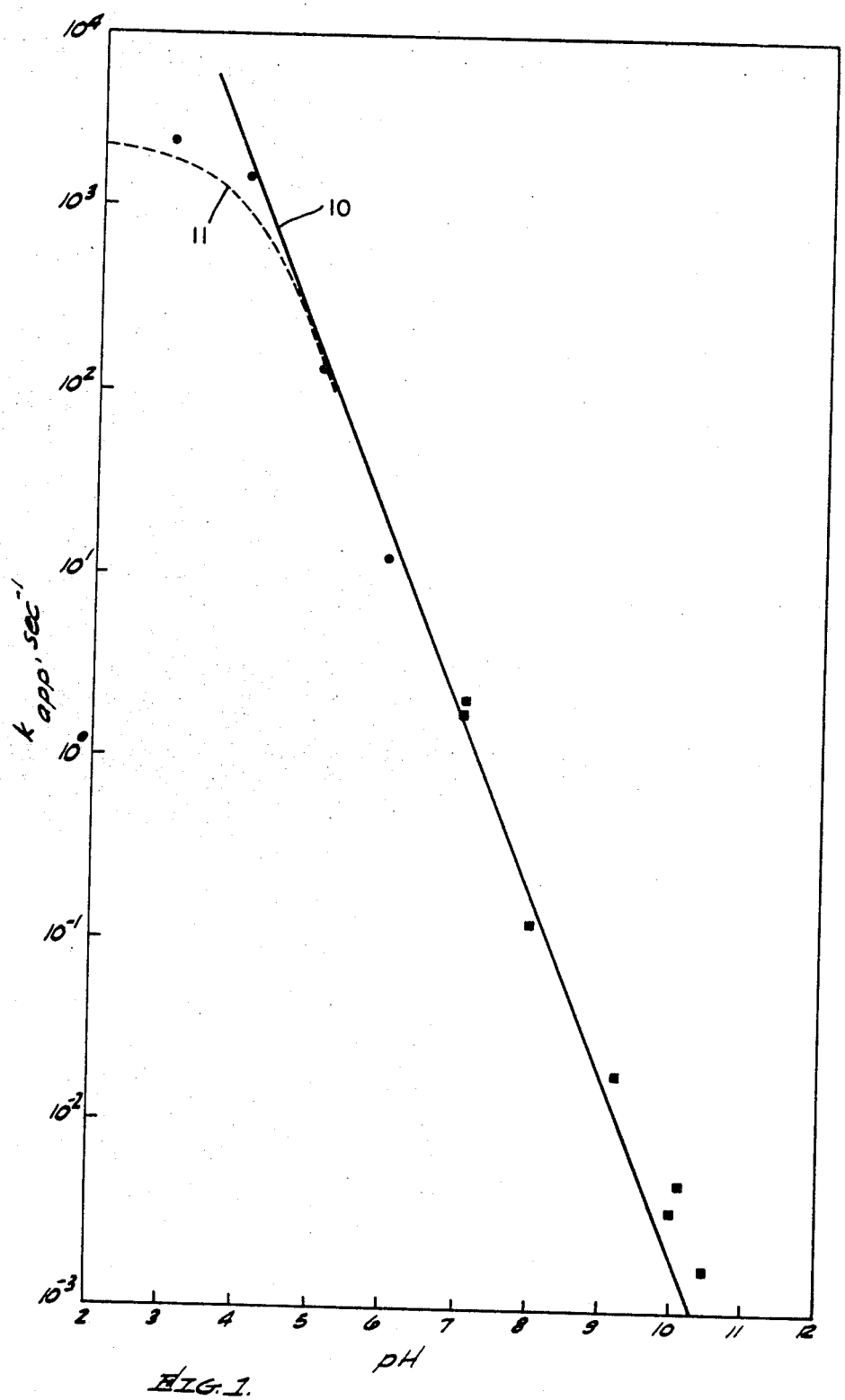

United States Patent [19]
Margerum

[11] 3,741,628
[45] June 26, 1973

[54] METHOD OF CONTROLLING THE INTENSITY OF A LIGHT BEAM USING PHOTOCHROMIC COMPOUNDS

[75] Inventor: John D. Margerum, Chatsworth, Calif.

[73] Assignee: Hughes Aircraft Company, Culver City, Calif.

[22] Filed: Dec. 29, 1970

[21] Appl. No.: 102,547

Related U.S. Application Data

[62] Division of Ser. No. 676,544, Oct. 19, 1967, Pat. No. 3,649,549.

[52] U.S. Cl.............................. 350/160 P, 252/300
[51] Int. Cl. .............................................. G02f 1/36
[58] Field of Search.................................. 350/160 P

[56] References Cited
UNITED STATES PATENTS

| | | | |
|---|---|---|---|
| 3,500,241 | 3/1970 | Jorkholm | 331/94.5 |
| 3,500,230 | 3/1970 | Kafalas | 331/94.5 |
| 3,278,449 | 10/1966 | Hardwick et al. | 350/160 P |

OTHER PUBLICATIONS

Exelby et al., "Phototropy (or Photochromism)," Chemical Reviews, Vol. 65, 1965, pp. 247–260.

Primary Examiner—Ronald L. Wibert
Assistant Examiner—V. P. McGraw
Attorney—Alton V. Oberholtzer and James K. Haskell

[57] ABSTRACT

The disclosure herein relates to reversible phototropic systems, compounds and compositions and the discovery of photochromic structures which regularly undergo reversible phototropism as photo induced reversible color change in water and water containing substrates including particularly the control of their back reactions and the method of use thereof by providing a multiple color and color change indicator and/or light filters.

6 Claims, 7 Drawing Figures

METHOD OF CONTROLLING THE INTENSITY OF A LIGHT BEAM USING PHOTOCHROMIC COMPOUNDS

This is a division of application Ser. No. 676,544 now U.S. Pat. No. 3,649,547, filed Oct. 19, 1967.

This invention relates to the discovery of water soluble reversible photochromic systems, material therefor and the method of use thereof to provide a color indicator and color change with ultraviolet light. More particularly, this invention and discovery relates to the method of providing for color change in aqueous compositions by application and control of the pH of water soluble aromatic photochromic nitro compounds providing ionic structure, in aqueous mediums, wherein an aromatic carboxylate group is para or ortho to a $-CHR_2$ substituent which also has a nitro group, or groups, in the ortho or para position relative to the $-CHR_2$ group, with the nitro group and the aromatic carboxylate group on the same or another aromatic ring. Essentially and preferably the most efficient reversible water soluble aromatic nitro carboxylate ions are those wherein a carboxylate group is ortho to the $CHR_2$ with an aromatic nitro group in the para or ortho position relative thereto. This new disclosure herein particularly provides for the method of utilizing the reversible photochromic aci-anion properties thereof in conjunction with effecting color changes under a controlled pH range in hydroxyl solvent material with ultraviolet light.

Heretofore, certain aci-anions, as produced from decarboxylations, do not form reversible processes and other known photochromic reactions affecting photoinduced color change. Some where only slightly water soluble and required o-nitro groups. Thus, the Art is in need of increased knowledge of more readily reversible phototropic materials and compositions containing chemical structures that provide reversible photochromic properties in conjunction with the determination and provision of pH control of aqueous solutions or compositions thereof. These, serve as optically active agents in cell or film filters, for modifying and timely controlling the output intensity of visible, ultraviolet, and laser beams, in addition to making it possible to effect a color indicator and provide for a color change in aqueous containing mediums, at low and high temperatures. Further, they enable the control and determination of flow and other characteristics under visible light conditions and treatment with ultraviolet light.

Accordingly, it is an object of this invention to provide the Art with the new knowledge of water soluble reversible aromatic carboxylic ion structures that show reversible photochromic properties functioning as optically active indicators and light valves in hydroxylic mediums.

Another object of this invention is to provide the art with the discovery and advancement of technical knowledge in the method of utilizing water soluble phototropically reversible p-nitrobenzyl structures providing photochemically induced absorption change, in aqueous solutions, aqueous mediums, or hydroxylic solvent material, and spontaneously reverting to the initial absorption spectrum in the absence of activating light.

An additional object of this invention is to provide the Art with the new knowledge of water soluble photochromic ion structures of para-nitrobenzyl derivatives which readily undergo reversible phototropism in controlled aqueous solutions or aqueous mediums and the method of application thereof therein.

A further object of this invention is to provide a method of obtaining an indicator color in combination with a photolyzed color change.

Further objects and advantages will be recognized from the following descriptions and illustrative examples of reversible aromatic photochromic carboxylic compounds, with para- or ortho-nitro group or groups on the same or another aromatic ring, which function as producing an indicator change and optically activated reversible light valves and in other processes generally typical of ultraviolet activated photochromic materials.

Figure 2:
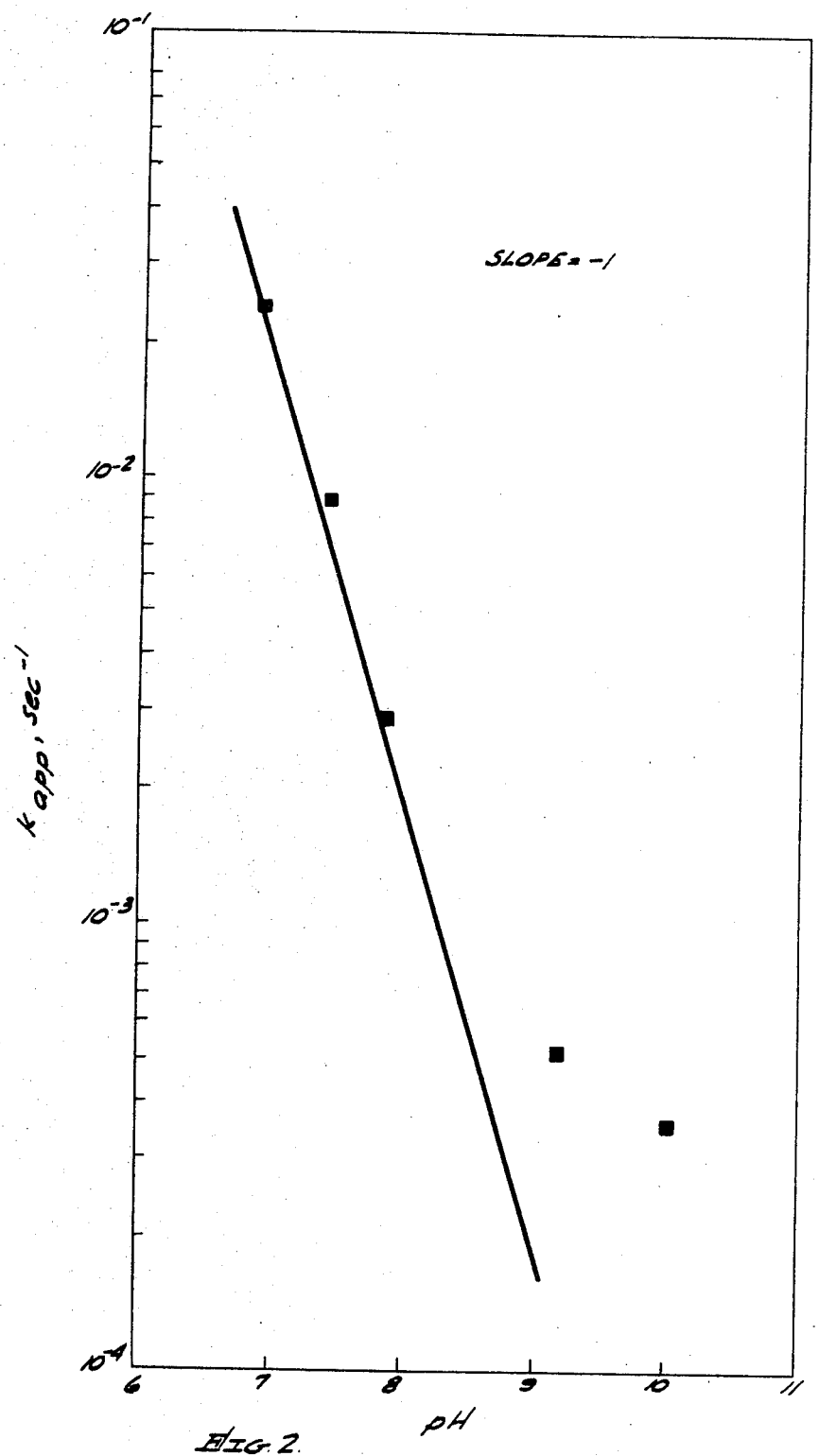
Figure 3:
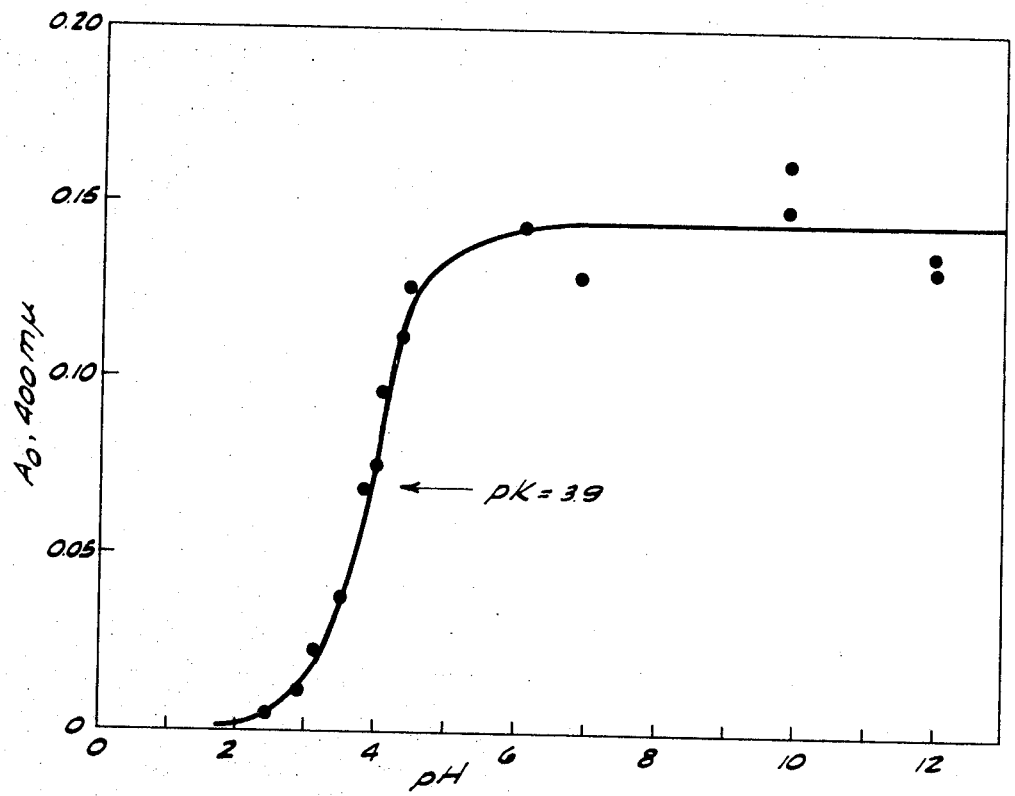
Figure 4:
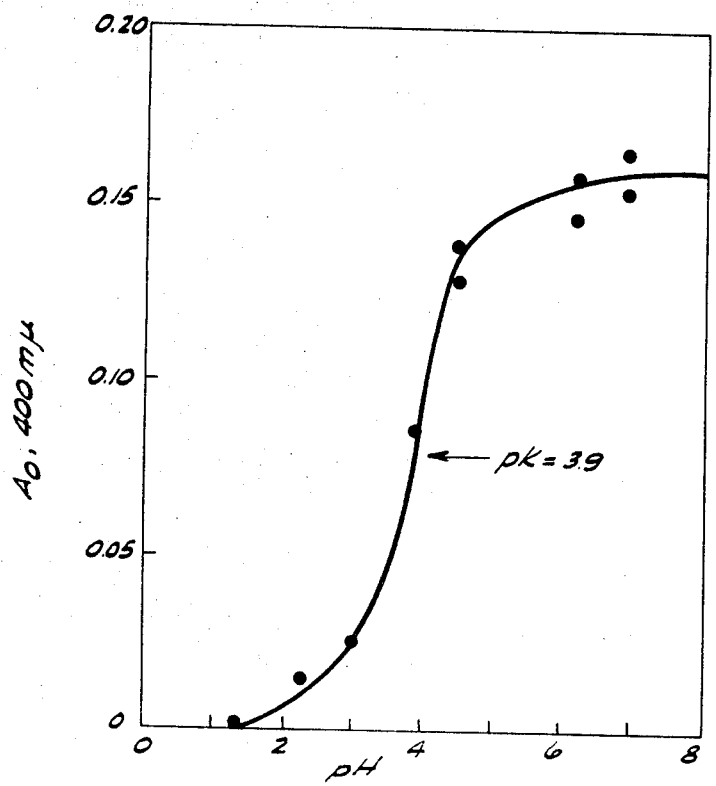
Figure 5:
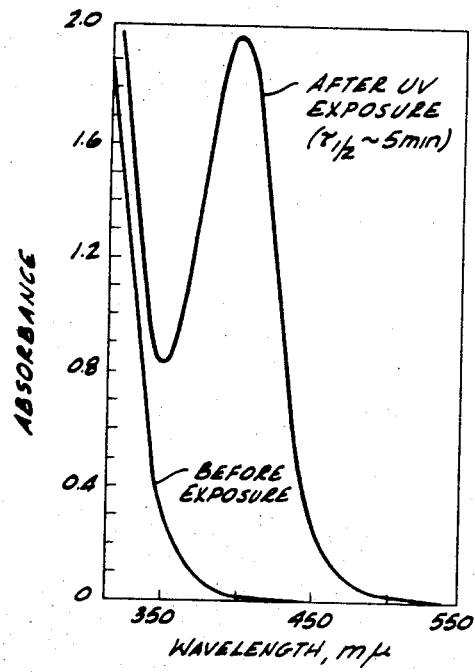
Figure 6:
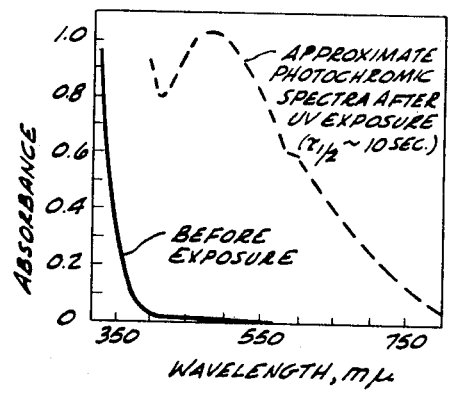
Figure 7:
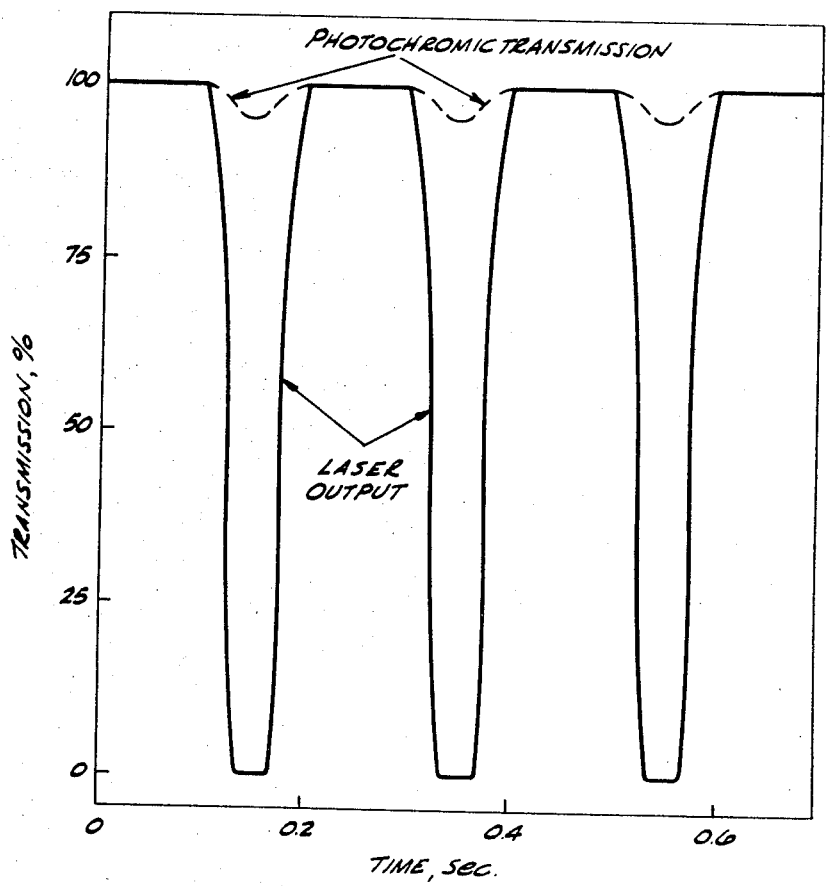

IN THE DRAWINGS:

FIG. 1, is illustrative of fading being a function of pH;
FIG. 2, is further illustrative of FIG. 1;
FIGS. 3 and 4, are illustrative of flash conversion of a photochromic compound and determination of an acid point;
FIGS. 5 and 6, are illustrative of the effects of phototropism of a nitrobenzyl ion material containing an alkyl in dilute aqueous bases;
FIG. 7, is illustrative of phototropic control of a laser with repeated ultraviolet exposure.

The types of chemical structures herein provided having reversible photochromic properties produced by the aci-ion structures in aqueous solutions and aqueous containing compositions of controlled pH on the order of 2 to 14 are: 2-(4'-Nitrobenzyl)benzoic acid, 2-(2'-Nitrobenzyl) benzoic acid, 2-(2',4'-Dinitrobenzyl)-5-Nitrobenzoic acid, 4-(4'-Nitrobenzyl)benzoic acid, 4-(2'-Nitrobenzyl)benzoic acid, 5-Nitor-o-toluic acid, 3-Nitro-o-toluic acid, 4,4'-Dinitrobenzyl-2, 2'-dicarboxylic acid, and the ionizable water soluble organic and inorganic salts of the above. Such salts may be water soluble ammonium, sodium, potassium, lithium, barium, strontium inorganic salts, and the water soluble amines and the like organic salts.

In general the basic ion structures herein provided are reversible photochromic carboxylic ions characterized in water containing compositions as having the para-nitro structures:

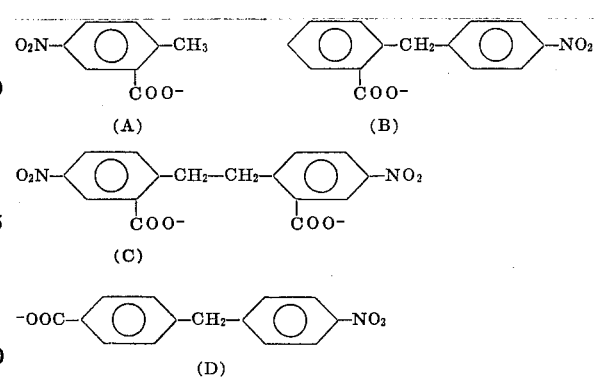

of which the para-carboxylate is least efficient. Preferably the reversible photochromic nitro structures are those in which an aromatic carboxylate group (or groups) is ortho to a $-CHR_2$ substituent, where $R_2$ is hydrogen or other carbon and hydrogen chain groups and which also has a nitro group, or groups, in the ortho or para position relative to the -CH group, as:

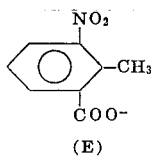
(E)

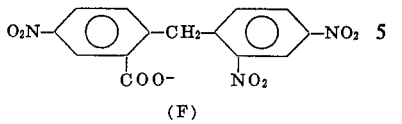
(F)

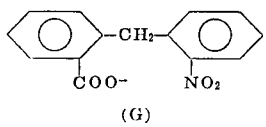
(G)

Additional examples of such aromatic carboxylic compounds which may be applicable herein are provided by the following:

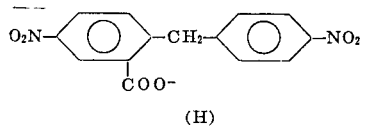
(H)

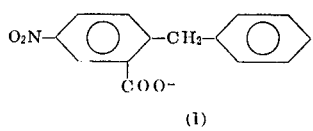
(I)

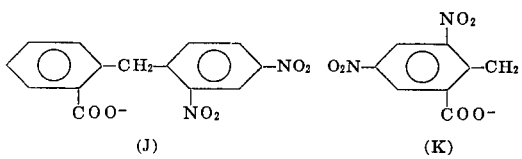
(J)          (K)

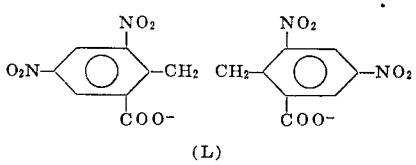
(L)

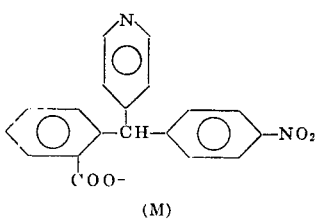
(M)

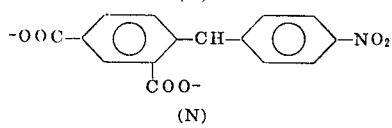
(N)

and the like, including mixtures of the same.

The nitrobenzyl compounds with the ortho-carboxylate group or groups undergo photochromic reactions more readily and efficiently than those without such carboxylate group.

EXAMPLE I

An example of a photochromic device using these materials was obtained simply by dissolving a small (trace) amount of mixture containing 2-(4'-nitrobenzyl)benzoic acid and 2-(2'-nitrobenzyl)benzoic acid in a dilute $NH_4OH$ (slightly alkaline pH 6) solution. When placed in a glass or quartz cell, this solution readily turned from colorless to a dark yellow upon exposure to ultraviolet light of less than 4000 A. Upon removal of the ultraviolet light, the solution returned to colorless. When these cells were used as filters in front of a mercury arc that emitted both ultraviolet and visible light, these photochromic solutions automatically self-attenuated the output intensity of the lamp at its 4040 and 4360 A. lines.

Further, the output and selection of wavelength of a laser beam, with an auxiliary ultraviolet light source, was controlled in either case by placing the photochromic filter inside and externally of the laser cavity (not shown) and controlling the ultraviolet light.

EXAMPLE II

An example of a photochromic control or modulation of lasers, for example of a pulsed argon-ion laser operated at 60 pp min., is illustrated as follows:

Photochromic solution = $10^{-2}$M sodium 2-(4-nitrobenzyl) benzoate in aqueous solution of pH 10. (bornte buffer solution)

Cell = 1 cm (path length) spectrophotometer cell placed inside the laser cavity.

Activation = 30 sec. exposure to UV Black Lamp (medium pressure mercury lamp filtered for 3660 A. line)

Results:

| Time | Intensity Relative of Laser Beam |
|---|---|
| Before exposure | 100% |
| Just after exposure (0 sec.) | 50% |
| 25 sec. after exposure | 66% |
| 55 sec. after exposure | 83% |
| 100 sec. after exposure | 92% |
| 240 sec. after exposure | 100% |

Thus, ultraviolet photochromic activation of this solution inside the laser cavity was used to control the output intensity of the argon-ion laser, particularly its "blue" emission lines at 4579, 4765, and 4880 A. and to a smaller extent its "green" lines at 5017 and 5145 A.

This could also be done with the cell outside of the laser cavity, but the effect is then not as large.

As illustrated in FIG. 1 the rate line 10 for the back (fading) from photolysis of 2-(4-Nitorbenzyl)benzoate ion solutions, at controlled pH values, is constant with a slope of −1 calculated by the formula: $\log k_{app} = -pH + \log (k_3/K + [H^+])$, and as hereinafter more specifically set forth. The dashed curved line 11 illustrates a deviation from linearity at low pH. The curve points are a function of pH obtained by measuring optical density with reference to time.

FIG. 3, is illustrative of an initial conversion by flash photolysis of the 2-(4-Nitrobenzyl)benzoic ion in aqueous pH solution and demonstration of a determined pK value. The ion form

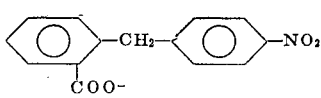

is photochromic whereas the

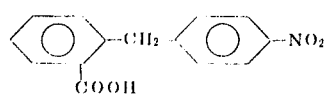

form is not photochromic.

FIG. 4, is similar to FIG. 3 illustrating a similar initial conversion by flash photolysis of the 2-(2'-Nitrobenzyl) benzoic ion in aqueous pH solution and use in determination of pK value, or color change effected as hereinafter exemplified. Thus, relative to pH value the acidity of the reaction is determined, for example for FIG. 3 by the formula:

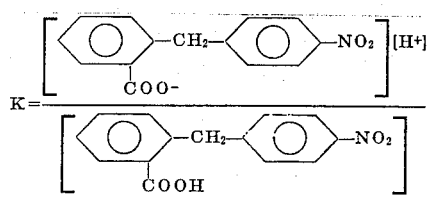

and in FIG. 4:

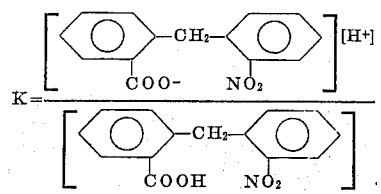

The life times $\gamma$ of these colored species $\cong 1/k_{app}$ e.g. if $k_{app} = 10^{-2}$, $\gamma = 1/10^{-2} = 100$ seconds. Typical conditions for these solutions:

photochromic material aqueous solution concentration = k in $10^{-4}$– $10^{-5}$M
pH as indicated usually with a buffer
the solutions are contained in 5 cm to 7 cm cells and exposed by flash exposure with a xenon flash tube, $\nu$ 18 joule input.

FIGS. 5 and 6 are illustrative of the photochromic conversion patterns of water soluble phototropic ion materials dissolved in dilute aqueous base of typical concentrations of photochromic $\cong 10^{-2}$M in 1 cm films (or cells) of approximately pH 12, upon 30 seconds exposure with 3,660 A "black lamp" ultraviolet source. The spectrum of FIG. 5 is the phototropic ion material

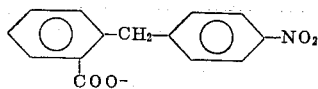

and the spectrum of FIG. 6 is of the phototropic ion

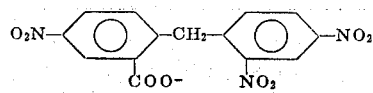

as derived from the acid form of each respectively.

The following are illustrative of photochromic conversions with the indicated ion and ion forming compounds in typical concentration of photochromic material, as indicated, and the color changes effected with an indicator:

EXAMPLE III a. A typical aqueous solution of

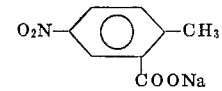

at a temperature of 25°C containing phenolphthalein indicator adjusted with 0.01 N base until pink pink $\underset{}{\overset{UV}{\rightleftarrows}}$ yellow b. The same solution with no indicator, with a pH meter pH 9.2 $\underset{}{\overset{UV}{\rightleftarrows}}$ pH 8.7 c. An aqueous solution of typical concentration of the photochromic ions
1. With phenolpthalein red pH 9.5 $\underset{}{\overset{UV}{\rightleftarrows}}$ yellow pH 9.2

2. Using pH meter without an indicator
pH 10 colorless $\underset{}{\overset{UV}{\rightleftarrows}}$ pH 9.2 yellow As indicated, these photochromic reactions cause a reversible change in pH, thus providing an additional change when a suitable indicator is present, under low temperature conditions as illustrated by the following:

EXAMPLE IV a. Typical concentrations of $\cong 10^{-2}$ to $10^{-1}$M

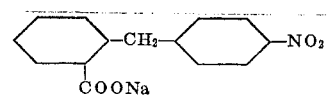

in a dilute base were prepared for exposure with UV light:

1. At 0°C (nitrogen bubbled to remove $O_2$), using phenol red (Indicator range 6.8 yellow - 8.4 red), with adjustment of indicator color to slight red with $H_2SO_4$ (pH~8.0).

pH~8.0 red $\underset{}{\overset{UV}{\rightleftarrows}}$ yellow-orange pH~7.2

2. At 25°C, using phenolphthalein [range = $\substack{colorless \\ 8.3}$ - $\substack{red \\ 10.0}$]- adjusted pH (color) with 0.1 N NaOH and 0.02N $H_2SO_4$

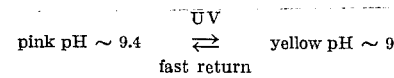

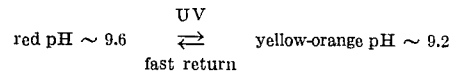

3. At 25° C., using thymolphthalein in solution with 20% ETOH $$\left[ \text{range} = \substack{color- \\ less \\ 9.3} - \substack{blue \\ 10.5} \right]$$

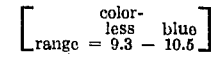

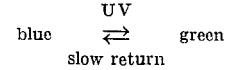

In the above examples it was discovered that the color change works best in the pH range of 5 to 9, although operable in unbuffered solutions of pH 4 to 10 upon exposure with ultraviolet lamp or flash.

Various mixtures of the above components were prepared in aqueous base solution and illustrate the following photochromic properties of activation and decay or lifetimes when used as filters under the control of ultraviolet light:

TABLE I.—PHOTOTROPIC COMPOUNDS IN AQUEOUS BASE

| Compound | Unexposed solutions, λ max., mμ | Photochromic species from UV photolysis [a] | | |
|---|---|---|---|---|
| | | Aci-type structure | λ Max.[b], mμ | τ at pH7,[c] seconds |
| 5-nitro-o-toluic acid | 284 | $-O_2N=\langle\rangle=CH_2$ ; $COO-$ | 362 | 8.7 |
| 4,4'-dinitrobibenzyl-2,2'-dicarboxylic acid | 286 | $-O_2N=\langle\rangle=CH-CH_2-\langle\rangle-NO_2$ ; $COO-\ -OOC$ | 372 | 65 |
| 2-(4'-nitrobenzyl)benzoic acid | 287 | $\langle\rangle-CH=\langle\rangle=NO_2-$ ; $COO-$ | 400 | 0.44 |
| 4-(4'-nitrobenzyl)benzoic acid | 283 | $-OOC-\langle\rangle-CH=\langle\rangle=NO_2-$ | 425 | 75 |

[a] Xenon flash lamp exposures filtered with Corning CS 7-54 filter.
[b] From photolyses in the pH range 10 to 12.
[c] Measured with $2 \times 10^{-5}$ M solutions, near 25°, in phosphate buffer, outgassed on a vacuum line. The lifetime $\tau = 1/k_{app}$, where $k_{app}$ is the apparent first order rate constant at pH7.

Further illustrative of spectral activity in aqueous base is the following table:

TABLE II

| Compound Forming The Corresponding Nitrobenzyl benzoate ion | UV Photolyzed Solutions Aqueous Anion (1.5°, $O_2$ free pH 13) |
|---|---|
| 2-(4'-Nitrobenzyl)benzoic acid | Yellow, 396 |
| 2-(2'-Nitrobenzyl)benzoic acid | Yellow, 398 |
| 2-(2,4-Dinitrobenzyl)-5-nitrobenzoic acid | Purple-red, 465 |
| 4-(4'-Nitrobenzyl)benzoic acid | Yellow, 420 |

Absorption maximum given in nm.

An example of using these photochromic structures in a film form is exemplified by the following: a film composition consisting of an aqueous solution of pH = 10 containing one percent of a polysaccharide thickening agent, and 0.1 M sodium 2-(4-Nitrobenzyl)benzoate was contained in a sandwich glass cell with a path length of 0.017 cm; a 5 sec. exposure with a 200 watt super high pressure mercury arc; immediately produced a bright yellow color which faded rapidly in the absence of the activating light. This process was repeated many times.

In aqueous base solutions, the photochromic effect of the o - carboxylic acid is enhanced and made more efficient by the presence of an added proton acceptor. For example, an aqueous solution that is 2M in sodium acetate buffered with sodium hydroxide, or other alkaline material, to a low pH range improves pH range phototropic reversibility in that the rate of the back reactions are faster. All of these p-nitrobenzo compounds show to a degree irreversibility in their phototropism, particularly in the upper pH range and in the presence of oxygen. Accordingly, where speed of back reaction is necessary, they are best operable in substantially oxygen-free aqueous solutions in the lower pH range, in combination with a proton acceptor.

The preferred photochromic compound, as indicated, are the water soluble p-nitrobenzo carboxylic derivatives which more readily and efficiently undergo phototropism. The reaction is particularly efficient when an aromatic carboxylic group is o to the methylene part of a p-nitrobenzo structure. These compounds appear to follow an overall general reaction process of:

$$\text{Nitro} \underset{\rightleftarrows}{\overset{h\nu}{}} \text{aci-anion}^- + H^+$$

wherein the photolysis reaction causes the transfer of a methylene hydrogen, to a more acidic site, and also converts the tetrahedral methylene structure to a planar methine structure. Each of these reaction factors tend to stabilize the transient photochromic properties of the above. The orthocarboxylic group provides six-membered ring pathway for the photochemical transfer of hydrogen away from the methylene (or methyl) group. The aromatic nitro group serves the dual role of absorbing ultraviolet light to initiate the reaction and as a substituent favoring the formation of a metastable planar methine structure.

As indicated, the nitro group does not need to be on the same aromatic ring as the other group involved in the hydrogen transfer. For example, the following illustrate a mechanism for the photropic reaction of the above compounds:

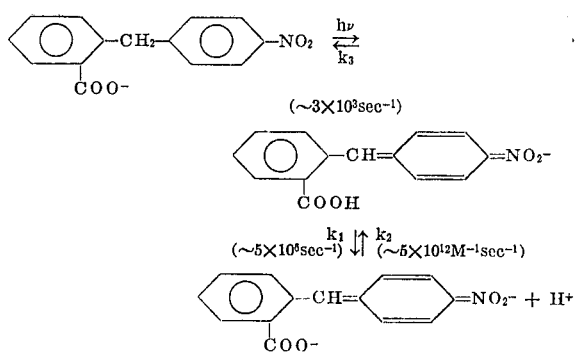

and the kinetics mechanism of the photochromic fading reaction is illustrated by that of 2-(4'-Nitrobenzyl)-benzoate ions, as follows:

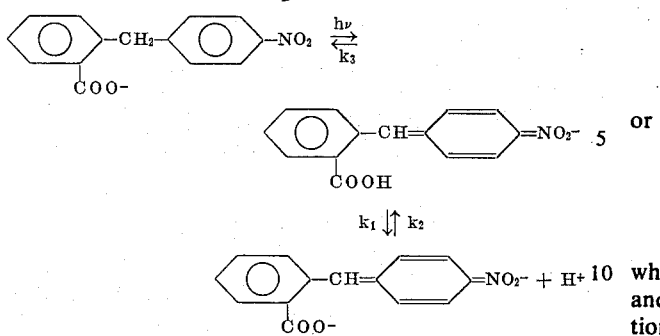

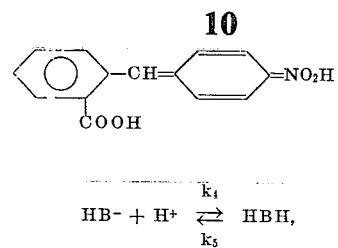

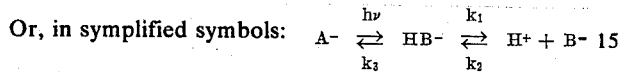

Or, in symplified symbols: $A^- \underset{k_3}{\overset{h\nu}{\rightleftarrows}} HB^- \underset{k_2}{\overset{k_1}{\rightleftarrows}} H^+ + B^-$ Where, $k_1/k_2 = K = (H^+)(B^{-2})/(HB^-)$.

The initial assumptions for a kinetic analysis are that $k_3$ is the rate determining step of the photochromic fading process, and that there is a prior equilibrium of $HB^-$ with $B^{-2}$ and $H^+$ (i.e. that $k_3 << k_1$ and $k_2$).

At pH > 6

The dissociation constant K is near $10^{-4}$. Thus, at pH's > 6 there will be very little $HB^-$ present, and the spectroscopically observed photochromism (at 400 m$\mu$) will be due entirely to $B^{-2}$.

$$[d(A^-)/dt] = k_3 (HB^-)$$

or $$[-d(B^{-2})/dt] = [-k_3/K](H^+)(B^{-2})$$

At a given pH, $$\int [d(B^{-2})/(B^{-2})] = [-k_3 (H^+)/K]\int dt$$

$$\ln (B^{-2}) = -k_{app} \cdot \tau + C$$

where, $k_{app} = k_3 (H^+)/K$ or $\log (k_{app}) = -pH + \log (k_3/K)$. Thus when the pH > 6, a plot of log ($k_{app}$) versus pH will have a slope of $-1$. If one assumes that K is $1 \times 10^{-4}$, then $k_3 = 3 \times 10^3$ sec$^{-1}$. Since $k_2$ would be about $5 \times 10^{10}$ (a typical value for other carboxylic acids), then $k_1 \cong 5 \times 10^6$.

In General

The concentration of $HB^-$ cannot always be ignored, particularly at pH < 6. In general, with a spectrophotometric analysis of the fading reaction, both $HB^-$ and $B^{-2}$ can be observed. Thus, in general let (P) = total conc. of photochromic species:

$(P) = (B^{-2}) + (HB^-) = (B^{-2}) + [(H^+)(B^{-2})/K] = (B^{-2})[1 + (H^+)/K]$ $dA/dt = -d(P)/dt = k_3(HB^-) = k_3/K (H^+)(B^{-2})$ $-d(P)/dt = k_3/K (H^+)(P)[K/K + (H^+)] = [k_3(H^+)/K + (H^+)](P)$

At a given pH, $$\int d(P)/(P) = [-k_3 (H^+)/K + (H^+)]\int dt$$

$$\ln (P) = -k_{app} t + C$$

Further illustrative of the aci-acid reaction and equilibrium condition at pH < 2 for the following:

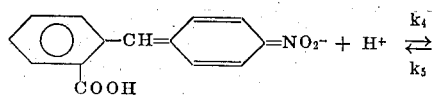

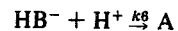

$$HB^- + H^+ \underset{k_5}{\overset{k_4}{\rightleftarrows}} HBH,$$

where $K' = k_5/k_4$ and the rate of the following direct recombination reaction takes place.

$$HB^- + H^+ \overset{k_6}{\rightarrow} A$$

The kinetics of the photochromic repetitive fading reaction follow the above over several orders of magnitude (milliseconds to hours.) in the pH range of about 3 to 11. The values given for $k_3$ above is based on the apparent rate constant and assumed ionization constant of $K = k_1/k_2 \cong 10^{-4}$. The value of $k_2$ is comparable to that formed for carboxylic acids ["Survey of Progress in Chemistry" Vol. 3, p. 81 (Academic Press, 1964)].

FIG. 7 is illustrative of an application and use of a change effected by phototropic control of a cw helium-neon laser with application of repeated ultraviolet penlight exposures in combination with the laser beam. Utilizing, for example, 2-(2,4-dimitrobenzy)-5-nitrobenzoate phototropic ion material ($10^{-4}$ to $10^{-2}$M) in aqueous phase containing a buffer (as sodium methoxide), at a nearly neutral pH in this film form (2 cm path length), as a film in the laser cavity, serves to substantially cut-off the laser intermittently in the order illustrated. In the drawing, the repetitious dotted lines represent the period of activation of color change under exposure of the phototropic film material to ultraviolet light used to modulate the 6328 A. output of the He—He laser. In this case the UV pen light was in effect turned off and on by flicking back and forth over the photochromic film, thereby providing manual modulation frequency of laser beam transmission. As evidenced by the phototropic reactions, the laser output is highly sensitive in controlling the output characteristics of lasers with an auxiliary light source. This provides a very sensitive and repeatedly reversible optical control for the modulation of output light intensities. By using various photochromic materials and combinations to perform as "optical grids", control of the Q of the laser cavity (amplifier) and the output of the laser is provided.

Alternatively, the laser can be considered as an optical amplifier which multiplies the effective absorbance recorded by a photochromic material. In this sense, the laser may be used to help overcome a photochromic material of realtively low sensitivity. For example, if a photochromic material normally requires an activating energy of 100 mj/cm$^2$ to reach a 90 percent attenuation level (O.D. = 1) then inside the cavity the same material would shut off about 90 percent of the laser intensity with an activating energy of only 1 mj/cm$^2$, thereby providing, for example, a more exacting control of the light beam, or for example, control of either or both laser beam and ultraviolet light used for patient treatment in the medical fields. In this respect, the water soluble photochromic ion material may alternatively be incorporated in an aqueous containing cell or film and used only with the ultraviolet light to provide a control or modification of the wavelength, duration, or intensity thereof, if desired.

In conjunction with attenuation of an argon-ion-laser containing a sample of phototropic film material, as herein provided, in the cavity, ultraviolet light exposure was used to convert the photochromic sample in the cavity and the effect on the laser was followed as a function of time. Exposure of the samples inside the cavity initially shut down the laser output completely, although the absorbance of the samples was only about 0.2. As the photo-induced color gradually faded (thermally), the laser came on again at a greatly reduced intensity. This reduced intensity is correlated with "effective absorbance" and the thermal effect of the laser beam appeared to accelerate the return rate of recovery to zero absorbance of the cavity samples. Thus, there is provided a number of applications of the water soluble phototropic ion materials as soluble, reusable, filter material for light control systems, as optical monitors for laser modulation, laser mode selection, image amplification, amplitude modulation and wavelength selection. This also includes personally or automatically governed reactions with medium, slow or fast return times, used as fast shutters, rapid modulators, or application of the photochromic material as the response medium with which one laser can control the output of another in a master-laser, slave-laser arrangement, as the operator selects and desires to suit his purposes.

Having described the present embodiments of my discovery in accordance with the Patent Statutes, it will now be apparent that some modifications and variations may be made without departing from the spirit and scope thereof. The specific embodiments described are provided by way of illustration and are illustrative of my discovery, invention or improvements which are to be limited only by the terms of the appended claims.

What is claimed is:

1. A method of controlling the intensity of a light beam containing ultraviolet light comprising placing in the path of said light beam an aqueous solution of an anion of one of the following formulas:

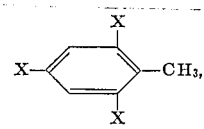

I and

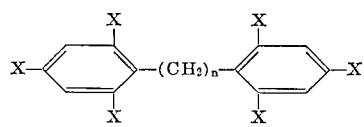

II wherein X is H, COO$^-$ or NO$_2$ and at least one X is COO$^-$ and another X is NO$_2$, and $n$ is 1 or 2.

2. A method of claim 1 wherein said light beam is a laser beam with ultraviolet light.

3. A method of claim 1 wherein said anion corresponds to formula I.

4. A method of claim 1 wherein said anion corresponds to formula II.

5. A method of claim 2 wherein said anion corresponds to formula I.

6. A method of claim 2 wherein said anion corresponds to formula II.

* * * * *